Jan. 10, 1950

JEAN ESTOUP
OTHERWISE KNOWN AS
HENRI ESTOUP
TELEGRAPHIC APPARATUS OF THE
STARTING-STOPPING TYPE 2,494,232

Filed Oct. 18, 1946

Inventor
Jean Estoup
otherwise known as
Henri Estoup
By
Attorneys

Jan. 10, 1950

JEAN ESTOUP
OTHERWISE KNOWN AS
HENRI ESTOUP
TELEGRAPHIC APPARATUS OF THE
STARTING-STOPPING TYPE 2,494,232

Filed Oct. 18, 1946

Inventor
*Jean Estoup*
otherwise known as *Henri Estoup*

By

Attorneys

Jan. 10, 1950

JEAN ESTOUP
OTHERWISE KNOWN AS
HENRI ESTOUP
TELEGRAPHIC APPARATUS OF THE
STARTING-STOPPING TYPE

Filed Oct. 18, 1946

Inventor
Jean Estoup
otherwise known as
Henri Estoup
By
Attorneys

Inventor
Jean Estoup
otherwise known as Henri Estoup
By
Attorneys

UNITED STATES PATENT OFFICE 2,494,232

TELEGRAPHIC APPARATUS OF THE STARTING-STOPPING TYPE

Jean Estoup, otherwise known as Henri Estoup, Sceaux, France, assignor to Societe D'Applications Generales D'Electricite et de Mecanique "Sagem," Paris, France, a corporation of France Application October 18, 1946, Serial No. 704,080
In France March 13, 1945

Section 1, Public Law 690, August 8, 1946
Patent expires March 13, 1965

15 Claims. (Cl. 178—23)

The present invention relates to "Teletype" transmitting, receiving and translating telegraphic apparatus of the "starting-stopping" type, which transmit and receive each character by means of seven equal impulses comprising a starting impulse, five code impulses and a stopping impulse. It particularly, but not exclusively, applies to apparatus in which the transmission control translation is obtained by mechanical means, without any intervention from the receiving device.

The object of the invention is to constitute an apparatus having all its moving parts driven by a single unregulated electric motor.

It is known that in "Teletype" transmitting and receiving devices the members thereof have different speed requirements as regards the driving motor speed regulation: some members can tolerate wide variations in speed, whereas others must be driven at perfectly constant speed. Such devices are also known in which speed regulation is effectuated by a centrifugal contact making and breaking the feed circuit to an electric driving motor. Of course, this arrangement has many drawbacks: the elements that could sustain speed variations react unfavourably, due to their inertia, upon the regulated speed and, accordingly, affect the operation of the speed-regulated members; consequently, the driving motor must be made oversize to provide against irregular and jerky driving. Furthermore, the regulator contacts wear out and cause "drifting" of the speed, requiring frequent readjustments, and parasitic impulses are transmitted which are almost impossible to remove completely.

According to the invention, for avoiding the said disadvantages, the electric motor drives directly the members tolerating substantial differences in speed; the members needing accurate speed regulation, being connected together and driven by means of a slipping friction connection and regulated by a mechanical centrifugal regulator frictionally absorbing the excess of available energy. Since small-size centrifugal mechanical regulators can only control a small power, it is necessary to reduce to a minimum the power to be regulated and render it as constant as possible. Consequently all controls causing important stresses on the regulated shafts are to be avoided and carried over to the non-regulated shafts, the function of the regulated shafts being limited to the disengagement of the non-regulated shafts. When a function necessitating an abruptly variable stress can only be accomplished by a regulated shaft, the stress variation has to be suppressed by disengaging, by means of the regulated shaft, a member pulled by a spring which is subsequently rewound as much as possible.

Consequently, the invention essentially consists in a transmitting, receiving and translating telegraphic apparatus of the "starting-stopping" type, comprising in combination, a key-board having keys on which the operator is striking, a selecting mechanism comprising the selecting members moved by each key according to the character to be transmitted, a distributing mechanism which transmits each combination according to the position of the selecting members, a receiving distributing mechanism positioning storing members according to each combination being received, a translating mechanism comprising seeking members capable of being displaced and of printing a character according to the position of combinators, a transfer mechanism performing at a determined time the positioning of the combinators according to the position of the storing members, and a printing mechanism operating the seekers and the printing members; characterized by the fact that all such mechanisms are divided into two groups, the mechanisms of one group having to revolve at a perfectly constant speed and those of the other group being allowed to revolve at a less perfectly constant speed. Operation is effectuated by a single electric motor of normally low speed variation, such as a direct current shunt motor or an alternating current non-synchronous motor, the transfer mechanism and the printing mechanism being thus on the one hand driven by means of constant ratio connections, whilst on the other hand, the transmission distributing mechanism and the receiving distributing mechanism, connected to each other by constant speed ratio connections, are driven by the motor by means of a friction slipping coupling, both last shafts thus receiving from the motor a stress which is independent from its speed and driving a centrifugal regulator frictionally absorbing the excess of available energy.

The invention also consists in other secondary arrangements, which will be more fully explained hereafter.

It will however be fully understood by means of the following disclosure and of the accompanying drawing, which is a simple diagram mainly given as example. In the said drawings.

General arrangement

Figure 1:
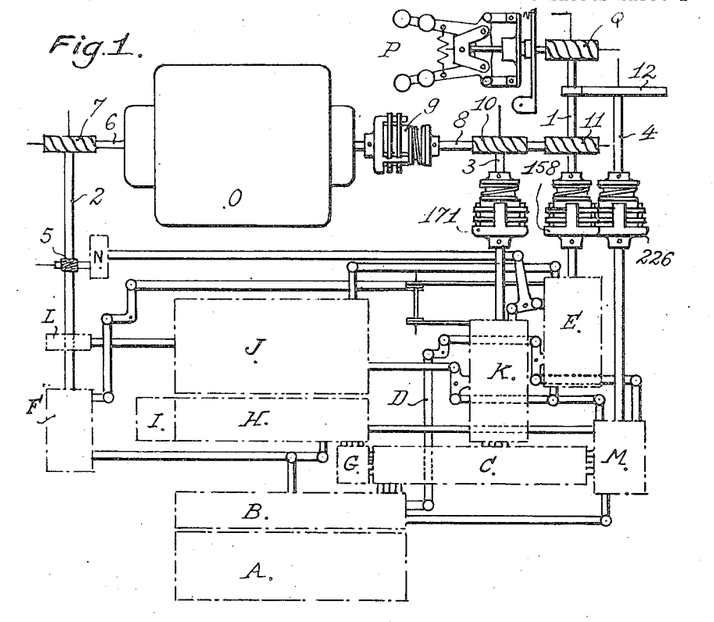
Fig. 1 shows in diagrammatical form, the overall arrangement of the apparatus which is the object of the invention.

The overall arrangement is given in Fig. 1 in the form of a diagram. For transmitting, the operator strikes on a key of the key-board A; a selecting mechanism B positions, according to the key being struck, the storing members of an intermediate mechanism C; a disengaging mechanism D, operated by the key being struck, starts at the same time the transmission distributing mechanism E which receives its motion from the shaft 1 and the striking mechanism F moved by the shaft 2; by means of the tilting mechanism G the striking mechanism F first transfers the combination to be transmitted from the intermediate mechanism C up to the combining members of the printing-translating mechanism H connected to the code contacts of the contactor I; then, by the action of the printing-seeking mechanism J, it seeks and prints the character corresponding to the key struck; at the same time, the transmission distributing mechanism E performs, according to the position of the code contacts, the transmission of the currents represented by the actuated key; the shaft 2 revolves more rapidly than the shaft 1, so that the revolution of the striking mechanism will be completed before the end of the revolution of the transmission distributing mechanism E.

For receiving a combination, the currents coming from the line, energizing a relay not shown, set in motion the receiving mechanism K driven by the shaft 3; according to the currents being received, the receiving mechanism K positions the storing members of the intermediate mechanism C; by the end of its revolution, the receiving mechanism K starts the striking mechanism F which performs as for the transmission, the transfer of the combination from the storing members up to the combining members of the printing-translating mechanism H, then the seeking and printing of the character corresponding to the combination being received.

When the combination "letters" is translated by the printing-translating mechanism J, a reversing mechanism L, receiving its motion from the shaft 2 positions the printing mechanism, so that the characters subsequently received will be printed in letters. In the same way, the reversing mechanism L performs the positioning of the printing mechanism in order that the characters subsequently received will be printed in figures or punctuation marks when the combination "figures" is translated.

When the combination "Who is there?" is being received, a call signal transmitting mechanism M receiving its motion from the shaft 4 is started and causes the starting in continuous rotation of the transmission distributor E, at the same time as it is acting directly upon the intermediate mechanism C, in order to transmit the series of characters or signs which constitute the call signal of the apparatus.

A train of wheels N receiving its motion from the shaft 2 through a suitable reduction gear ratio 5 performs the starting of the motor O when a key is being struck or a combination received, and automatically stops in a determined time after striking the last key, or after receiving the last combination.

The mechanisms of the devices receiving their motion from the motor O can be divided into two groups having opposed requirements: the transmission distributor E, the receiving distributor K and the call signal M need a perfectly adjusted speed which is only obtainable by means of a regulator of low resistance variable within close limits; conversely the striking mechanism F and the reversing mechanism L require, and impose on the motor, high and suddenly variable stresses, but can allow of speed variations which are normally admissible in continuous current shunt motors, or in alternating current asynchronous motors, not provided with a speed regulator.

The motor O drives, on the one hand, the shaft 2 by means of a shaft 6, a worm screw and speed reducing gearing 7 and, on the other hand, a shaft 8 through a friction coupling 9. The shafts 1, 3 and 4 are driven by shaft 8 through the intermediary of worm and gear 10—11 and a reducing gearing 12, the speed of said shafts being determined by the regulator P driven by the worm screw and multiplying gear Q. It is only necessary to design the electric motor O so that its speed, in the most unfavourable conditions, be always higher than the speed assigned to the shaft 8 by the regulator P. Slipping will take place between both shafts 6 and 8, in coupling 9, whereby driving of the shaft 8 is had at constant speed variations in the speed of the motor O affecting said constant speed.

Electric operation

Figures 2, 3:
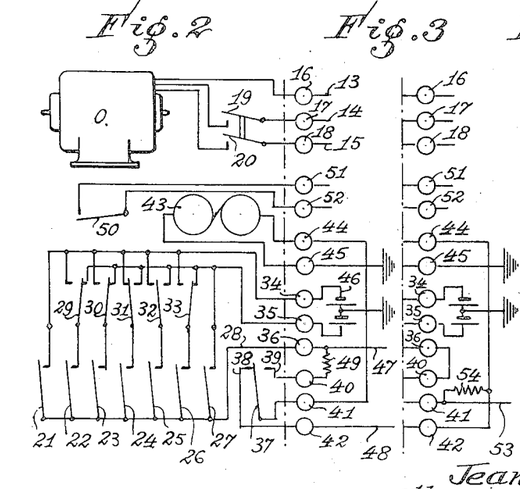
Fig. 2 shows the electric circuits of the said apparatus supposed connected in two-wire double current.
Fig. 3 shows the one-wire double current connections.

Fig. 2 shows the electric circuits of the apparatus with their connections, in the case in which two lines are available, used respectively for transmitting and receiving.

The motor O is normally energized by the three-phase alternating lines 13, 14 and 15 having terminals 16, 17 and 18. The terminal 16 is directly connected to the motor O. The terminals 17 and 18 are connected to said motor through contacts 19 and 20 operated by means of the automatic starting and stopping mechanism N. If one-phase alternating current or direct current is available only, the terminals 16 and 17 as well as the contact 19 will only be used.

The transmission is accomplished by means of the contacts 21, 22, 23, 24, 25, 26 and 27 successively placed in circuit, by the distributor E. The contact 21 connects the common negative wire 28, the positive wire 27 and each of the contacts 22, 23 and 24, 25 and 26 with the polarity established by the contacts 29, 30, 31, 32 and 33 of the contactor I. The input and output of the transmission circuit thus constituted are made through the terminals 34, 35 and 36.

A "transmission-reception" cam of the transmission distributor E closes the contacts 37—38 and 37—39. The circuit thus defined is connected to the terminals 40, 41 and 42.

When the transmission mechanism E is at rest, the contacts 27 and 37—38 are closed; when, under the action of a key being struck, the transmission mechanism E is set in rotation, the said contacts 27 and 37—38 are opened and the contacts 21, 22, 23, 24, 25 and 26 are successively closed, each for the time of an impulse; closure of the contact 27 is then made. The contact between 37—39 is made during the time of closure of the contacts 21, 22, 23, 24, 25 and 26, then during the beginning of closure of the contact 27. It is interrupted and the contact 37—38 is reestablished when the transmission mechanism returns to its rest position.

The receiving electromagnet 43 is connected to the terminals 44 and 45.

For connecting the apparatus in two-wire double current as shown in Fig. 2, terminals 34 and 35 are respectively connected to minus and plus of the transmitting cell 46. The transmission line 47 is connected to the terminal 36. The receiving line 48 is connected to the terminal 42 and the terminal 41 to the terminal 44. The terminal 45 is connected to earth. A control resistance 49 supplies the terminal 40 with part of the current being transmitted.

When the transmission mechanism is at rest, the currents coming from the line 48 follow the paths: 42, 38, 37, 41, 44, 43, 45, earth. When the transmission mechanism is operating the connection 37—38 is cut off; the currents coming from the transmission circuit reach the line 47 and are shunted through 49, 40, 39, 37, 41, 44, 43, 45, earth, to the receiving electromagnet. The transmission control translation being secured through mechanical means independent from the receiving device, the said branch circuit is not at all indispensable and the line 47 can be directly connected to the terminal 44, the three terminals 40, 41 and 42 remaining free.

The ringing contact 50 is connected to the terminals 51 and 52.

Fig. 3 shows the connections of the apparatus for one-wire double current. When the transmitting mechanism E, is at rest, the currents coming from the line 53 follow the path: 41, 37, 38, 42, 44, 43, 45, earth and consequently flow through the electromagnet 43. When the mechanism E is revolving, the currents being transmitted follow the path: 28, 36, 40, 39, 37, 41 and reach the line 53. A control resistance 54 can be inserted between the terminals 41 and 42 for standardization purposes, but it is not at all indispensable.

Figure 4:
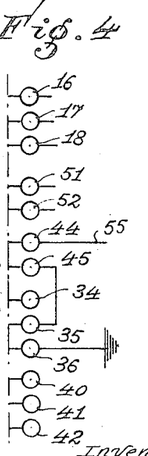
Fig. 4 shows the simple current connection.

Fig. 4 shows the connections to be made for the connection to a central battery. The line 55 is connected to the terminal 44 and the current then follows the path: 44, 43, 45, 35, emission circuit, 28, 36, earth. The electromagnet 43 and the transmission circuit are thus connected in series with the line, transmission being accomplished by switching off the line current.

It should be noted that receiving can be performed in double current, thus reducing the current intensity which is necessary and increasing the direct range of the apparatus, transmission being made by breaking of the resting polarity established in the line when the apparatus is not receiving.

Mechanical operation

Figure 5:
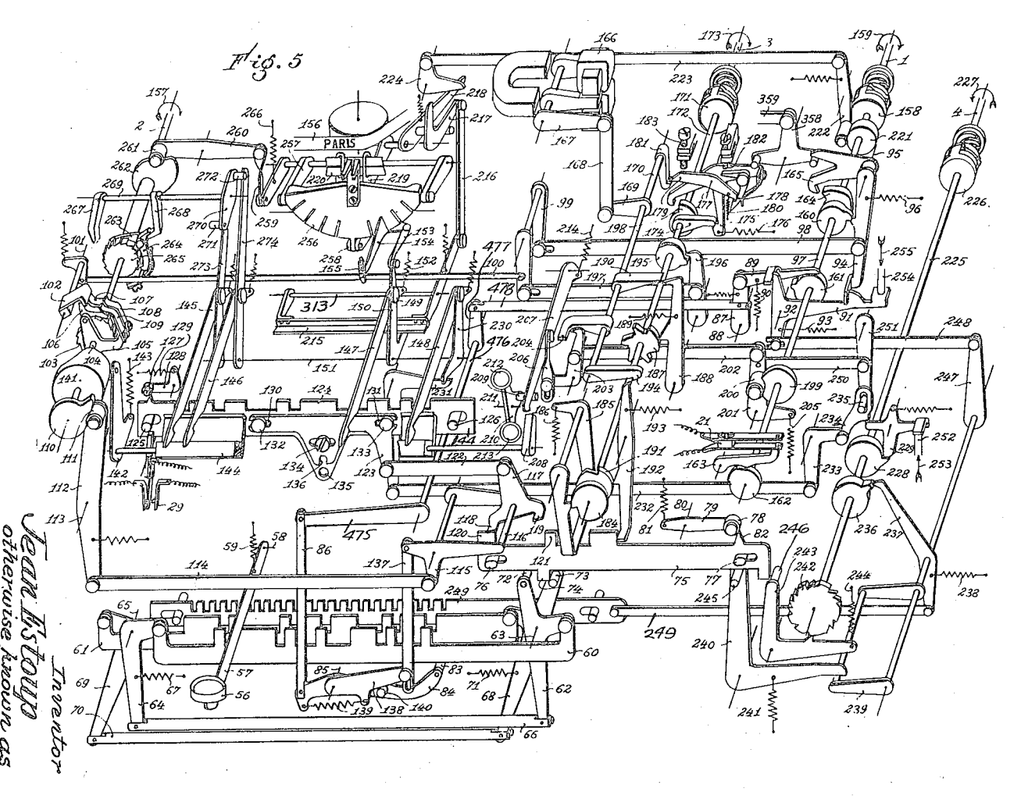
Fig. 5 shows the overall arrangement of the mechanism.

Fig. 5 illustrates the operation of the various mechanisms brought in action by striking a key, the transmission of the corresponding combination and its local translation, as well as the mechanisms set in operation in receiving a combination and its translation.

The shafts 1, 3 and 4 are driven by the motor O (Fig. 1), as explained above, and revolve at a perfectly regulated speed. The shaft 2, driven directly by the motor, revolves at a slightly variable speed only.

Manipulation and selection of a combination

For transmitting a character, the operator strikes a key 56 carried by the key lever 57 pivoted about the axis 58 and retracted by the spring 59. The key lever 56 pushes five bars of a set of ten selecting bars disposed in complementary pairs, each pair 60—61, only one of which is shown, corresponding to a code impulse. The selecting bar 60 is held by the lever 62, freely pivoted about the axis 63, and by the lever 64 pivoted about the axis 65. The levers 62 and 64 are connected by the rod 66. The assembly forms a parallelogram which imparts to the selecting bar 60 a substantially vertical displacement. A spring 67 calls back the selecting bar 60 upwardly. In the same way, the selecting bar 61, held by the levers 68 and 69 pivoted about the axes 63 and 65, and connected together by the rod 70, has a vertical displacement. It is kept raised by a spring 71.

The levers 62 and 68 are provided with two fingers 72 and 73 adapted to press against a tooth 74 of a storing bar 75 slidable upon two spurs 76 and 77. A roller 78 carried by a lever 79, which can revolve about an axis 80 and is subjected to the action of a spring 81, is urged against a tooth 82 of the storing bar 75 in order to be able to throw the same towards either of its end positions.

Although only one storing bar is shown, there are as many pairs of the said bars as of pairs of selecting bars, each storing bar being operable by one pair of selecting bars.

At rest, both fingers 72 and 73 are withdrawn to allow free movement to the bar 75. As the operator lowers the key 56, he displaces vertically one of the selecting bars 60 or 61 and pushes the corresponding fingers 72 and 73 towards the tooth 74. If the storing bar is in the position corresponding to the polarity of the selecting bar being considered, it undergoes no displacement. If it is in the other position, it is displaced.

Consequently, as a key is finally lowered, the storing bars such as 75 are in the positions corresponding to the polarities of the impulses corresponding to the key being struck.

Transfer of the combination

One of the two selecting bars lowered pushes a finger 83 secured to a lever 84 pivoted about an axis 85. By this movement the lever 84 lifts a rod 86 attached to a lever 475 pivoted about an axis 476, said axis carrying a second lever 477 which, through the intermediary of a bar 478 moves lever 87. Said lever 87 is pivoted about the axis 88 and carries the pusher 89 pressed by the spring 90, said pusher holding the hook 91 pivoted at 92 and subjected to the constant action of the spring 93. The hook 91 adapted to release the stop-lever 94 pivoted at 95 and which, under the action of the spring 96, swings away from the transmission cam shaft 97.

By means of the rod 98, the lever 94 pulls the frame 99, whereby the rod 100 swings about the axis 101, the translating cams stopping member 102. The clutch of the translating cams is constituted by two ratchets 103, secured on the shaft 2, of which only one can be seen in the figure. The translation cam shaft 104 is driven by a slight friction from the shaft 2. It carries an arm 105 driving two pawls 106 and 107 constantly pressed back towards the ratchets 103 by the flat springs 108 and 109. At rest, the pawls 106 and 107 abut against the stop 102, away from the ratchets 103. When the member 102 is tilted, both pawls 106 and 107, left to the action of the springs 108 and 109, fall on the ratchets 103 and the shaft 2 drives the shaft 104.

As shaft 104 begins to rotate, the transfer cam 110 displaces a roller 111 secured on the lever 112, pivoted at 113, and pulling the rod 114 to tilt the frame 115. Said frame carries a shaft 116 around which are freely pivoted five tumbler members 117 (only one of which is shown) and which are moved towards the storing bars such as 75.

The storing bar 75 is provided with two teeth 120 and 121 movable in front of either of the teeth 118 and 119 of tumbler 117, as the storing bar assumes either of its end positions. Supposing that the storing bar 75 is in its right position, the end 120 comes in engagement with the tooth 118 and the tumbler member 117 is tilted in clockwise direction, driving by means of the bar 122 and the arm 123 the combining bar 124 slidable longitudinally on the pins 125 and 126; the positions of the bar are controlled by a jumping roller 127 carried by a lever 128 subjected to the action of a spring 129. Each combining bar drives one of the code contacts 29, 30, 31, 32 and 33 (Fig. 2) of which only one is shown in Fig. 5, the code contacts being thus positioned during the transfer of the combination without the receiving device intervening in any way.

In order to facilitate the setting of the apparatus, the arm 123 is adjustable longitudinally in a tight fit along the combining bar 124 by means of two slots 130 and 131 engaged by the studs 132 and 133. It is locked by a screw 134 and can be displaced after unlocking of the said screw by inserting in the hole 135 provided in the combining bar 124 the end of a special key, a bolt formed on the key entering an aperture 136 provided in the arm 123.

The combination determined by the striking of the key 56 is thus transferred, from the start of rotation of the translation cam shaft 104, in the combining bars 124 integral with the code contacts 29, 30, 31, 32 and 33.

Rhythmic device

Whilst the transfer is being accomplished, a rhythmic impulse is sent to the operator's finger through the following device: the frame 115 pulls through the rod 137 a lever 138 which can freely pivot about the axis 85. A strong spring 139 urges together the levers 84 and 138. A stop 140 secured upon the lever 84 limits any drawing closer of the levers 84 and 138. When the transfer is being performed, the lever 138 is lifted. The lever 84, maintained by the finger of the operator, remains in its place, but conveys to the finger the pressure of the spring 139, advising the operator that the transmission is under way.

Translation and printing of the manipulated character

The combination is translated and printed during the remainder of the revolution of the translating cams, as follows: the shaft 104 carries a striking cam 141 which, acting upon the lever 142 tensioned by a strong spring 143, allows the forward displacement of a universal striking bar 144 which, during the first part of its stroke, frees the seeking levers to fall on the combining bars 124, four of the said seeking lever 145, 146, 147 and 148 being shown in the figures.

The lever 147, for instance, controls the printing of a character. It can revolve around a pivot 149 carried by a bell crank 150 which can freely pivot about the shaft 151 common to all such cranks. A spring 152 constantly urges lever 147 downwards and backwards. During the displacement of the striking bar 144, the seeking lever 147 falls on the combining bars 124. It is stopped when meeting a tooth of a combining bar. It is only the lever which meets an alignment of five slots that is falling. If it is supposed that this is the case for the seeking lever 147 it continues to fall and is engaged by the striking bar 144 which pulls it forward. By means of a pull-bar 153, the lever 147 pulls a lever 154 carrying a character 155 which is thus struck upon the paper 156 and prints through the inked ribbon 220.

As the shaft of the translating cams 104 ceases to rotate, the pawls 106 and 107 come into engagement with the stop 102. They are released and the shaft 104 remains still.

For avoiding that the shaft 104 be driven forwards by the action of the spring 143, when the lever 142 performs its advancing motion, the teeth of both ratchets 103 are opposed: the one drives the arm 105 in the direction of the arrow 157, the other in the opposite direction. The retaining pawl could rest upon the teeth of the ratchet without being disengaged when the shaft of the translating cams is in resting position. The mechanical operation of the device would not be altered but the jumping up of the pawl on its ratchet would produce a continuous noise which is avoided by simultaneously disengaging both ratchets.

Transmission

At the same time as the lever 94 causes the starting of the translating cams for a revolution, the shaft 97 of the transmission cams is started by the following mechanism: the shaft 97 is connected by a friction 158 to the shaft 1 revolving in the direction of the arrow 159 at a perfectly constant speed. It is thus subjected to a constant stress in the direction of the arrow 159. When the shaft 97 is at rest, the cam 160 presses upon the lever 94 and keeps the shaft 97 stationary. When the lever 94 is removed, it releases the shaft 97, which begins to rotate.

From the beginning of this rotation, a cam 161 lifts the lever 89. The hook 91 is released and comes out of engagement, avoiding a wrong starting in the case in which the key 56 be maintained depressed for a time longer than the transmission of the combination. The engagement is reestablished when the lever 89 is again drawn back, which takes place as the operator strikes another key.

Through the distributing cams, of which only one 162 is shown, acting upon the contacts 21, 22, 23, 24, 25, 26 and 27 and 37—38—39 (Fig. 2) of which only one (21) is shown Fig. 5; and by means of five levers, of which only one 163 is shown, the operator proceeds to the transmission of the combination corresponding to the key being struck, the polarities of the code impulses being defined by the contacts 29, 30, 31, 32 and 33.

At the same time, a cam 164 lifts the lever 165 integral with the lever 94 and brings once more the latter in engagement with the hook 91. Immediately before returning to rest, the cam 164 releases both the levers 165 and 94. If the hook 91 is in engagement, the lever 94 stops the cam 161 and locks the transmission cam shaft 97 in resting position. If the hook 91 has been brought out of engagement by a new key strike, the lever 94, drawn by the spring 96, falls down to cause, through the rod 98, the frame 99 and the rod 100, the lifting of the stop 102, which initiates a revolution of the translating cam shaft 105, at the same time as the rotation of the continuous transmission cams, without stopping for another revolution.

*Reception of a combination*

The line current flows through the windings of the electromagnet 166, the armature of which actuates, by means of the lever 167, the link 168 and the lever 169, the shaft 170 of an oscillating train, the alternating motions of which recreate the nature of the impulses coming from the receiving line. On the other hand, the permanently rotating regulated shaft 3 moves through a friction device 171 the receiving cam shaft 172 in the direction of the arrow 173.

In idle position, the lever 169 is maintained depressed by the electromagnet 166. The receiving cam shaft 172 is provided with a spur 174 which comes in engagement with a hook carried by the stop lever of the receiving cams 175, subjected to the constant action of a pull-back spring 176 and capable of freely pivoting about the axis 177. The stop lever 175 is provided with a hook and pawl 178 upon which presses a disengaging lever 179 subjected to the constant action of a spring 180 and which rests against and is held by a hook 181 carried by the oscillating train shaft 170. The stop lever 175 is thus held in the path of the spur 174 arresting in idle position the shaft 172 of the receiving cams.

If it be supposed that the electromagnet 166 receives a starting impulse, the armature 167 is lifted, moving the lever 169 and turning the oscillating train shaft 170 in clockwise direction. The hook 181 being withdrawn, the levers 179 and 175 are oscillated and release the spur 174. The receiving cam shaft 172, rotated by the shaft 3, revolves in the direction of the arrow 173. The pawl of the hook 178 comes in contact with the stop 182 and releases the lever 179 which, brought back by its spring 180 in contact with the stop 183, allows the free movement of the oscillating train shaft 170.

From the beginning of the revolution, under the action of a spring 186, a restoring cam 184 allows a frame 185 to fall down upon the assembly of storing bars, such as 75, in order to move them to the right in the position corresponding to the "working" polarity. The frame 185 is then rapidly brought backwards by the cam 184 in order to allow the free displacements of the storing bars.

After a time equal to the sum of the starting impulse and of half the first code impulse, a correcting cam 187 releases a correcting lever 188 which, urged by the spring 189 falls upon a blade 190 carried by the oscillating train shaft 170. The oscillating train is thus held, for a little while, in the position it had at the time of the fall of the correcting lever 188. During that time, and under the action of the spring 193, a restoring cam 191 drops a call-back lever 192 upon the first storing bar 75. The lever 192 can be prevented from moving by a hook 194 carried by the shaft 170. Consequently, if it be supposed that the lever 167 is down, indicating the "idle" polarity, the hook 194 is lifted and the lever 192 freed to push the storing bar 75 towards its left position, corresponding to the "idle" polarity. If on the contrary, the lever 167 is lifted, to the "working" polarity, the hook 194 is lowered and the positioning lever 192 held thereby, leaving the storing bar 75 in its right position, corresponding to the "working" polarity. The correcting lever 188 and the call-back lever 192 are subsequently lifted by the cams 187 and 191, allowing the free displacements of the oscillating train 170 until the time corresponding to the middle of the second code impulse, at which time the correcting cam 187 allows again the correcting lever 188 to drop upon the blade 190. Thereafter, a restoring cam allows a restoring lever to fall upon the second code impulse storing bar (not shown), and so on successively for all code impulses.

By the end of the revolution, a translating releasing cam 195 acts upon the lever 196 which, by means of the bar 197, swings the frame 99, thus starting the shaft of the translating cams 104, which effectuates the transfer of the combination of the storing bars, such as 75, to the combining bars such as 124, then the translation and printing of the corresponding character, as previously stated for the translation of the transmission control.

During the revolution of the receiving cams 172, a cam 198 restores the lever 175 back in the path of the spur 174. The hook 178 comes in engagement with the lever 179. By the end of the revolution, the cam 198 releases the lever 175 which, in moving the thrust lever 179, is stopped by the hook 181. The spur 174 comes in contact with the stop lever 175 and stops the receiving cam shaft 172 in idle position.

*Locking of receiving mechanism during transmission*

When the electromagnet is energized by a parallel flow of the transmission line current, as in Figs. 2 and 3, or by the current of the line connected in simple current, as shown in Fig. 4, the transmission of a combination would have the effect of causing the operation of the electromagnet and, consequently, the operation of the receiving mechanism, unless special precautions were taken. The combination, already translated by mechanical means, as it is transmitted, would be translated a second time by means of the receiving mechanism.

To avoid this drawback, a locking cam 199 secured to the transmission cam shaft 97 acts upon a roller 200 pivoted on a lever 201 which, through a bar 202 actuates a receiving locking lever 203 capable of engaging a locking hook 204 fixed upon the oscillating train shaft 170. When the transmission shaft is idle, the roller 200 enters a slot of the locking cam 199. The spring 205 retracts the locking lever 203 and allows free movement of the oscillating shaft 170. If it be supposed that the transmission cam shaft 158 starts revolving, the roller 200 is expelled from its slots and moves the locking lever 203 which, during the complete revolution of the shaft 97, prevents the lifting of the lever 169 by the electromagnet and, consequently, the starting of the receiving device.

Cutting-out of the transmission control translation

By means of the lever 203 and the link 206, the locking cam 199 raises the hook 207 which is adapted to engage a finger 208 carried by the striking bar 144 when the transmission shaft 97 is in idle position. The hook 207 can also be held raised by a spur 209 carried by lever 210 pivoted at 211 and which can assume two positions by means of a jumping roller (not shown). Two keys 212 and 213 are used to bring it in either of said positions. In the figure the key 213 is supposed to be depressed: assuming that the transmission shaft 97 is revolving, the lever 203 allows the hook 207 to drop upon, and be stopped by the spur 209. The translation proceeds as described above. Supposing, further, that the key 212 is depressed, the spur 209 is lowered and the hook 207, pulled by the spring 214, falls upon the finger 208. The translation cam shaft 104 being set in operation at the same time as the transmission shaft 97, the transfer of the combination is accomplished by the cam 110, from the storing bars 75, up to the combining bars 124 connected to the code contacts 29. Consequently, the transmission of the combination proceeds normally; but the striking bar 144 being stopped by the hook 207, the translation and printing of the corresponding character do not take place. However, if a combination is received, the translation cam shaft is started when the transmission cam shaft 97 is in idle position, the lever 201 holds the hook 207 raised and the translation is normally performed. The effect of lowering the key 212, consequently, stops the transmission control translation, but not the translation and printing of the combination received.

Two-colour translation

If it is supposed that a combination is translated after having been received, the lever 150 will drive a lever 217 by means of the universal bar 215 (common to all the characters) and the rod 216, and said lever 217 pushing the lever 218 will lift the ribbon-guide 219 so that printing will take place on the upper half of the inking ribbon 220.

Supposing, also, that a combination is simultaneously transmitted and translated, the two-colour cam 221, acting upon the lever 222, will actuate the arm 224 by means of the bar 223, the said arm pushing lever 218, lifting the ribbon-guide 219, so that printing will take place on the lower half of the ribbon 220.

Consequently, if the ribbon 220 is of two colours, for instance black inked in its upper half and red inked in its lower half, the combinations being received will be translated in black and the combinations being transmitted in red.

Call signal transmitter

The call signal of the apparatus is transmitted when the apparatus has received the combination: "Who is there?", by means of the above described transmitting device operated by a call signal operating shaft 225 driven by the shaft 4 by means of friction coupling 226 in the direction of the arrow 227 and which, at rest, is stopped by the cam 228 abutting against the stop lever 229.

If it is supposed that the combination: "Who is there?" is translated after being received, the seeking lever 148 falls, is drawn forward by the universal bar 144 and swings the lever 230 which, through the instrumentality of lever 231 and the bar 232, moves the arm 233. The said arm pulls downwards the pusher 234 which, in sliding on the spur 235, displaces the stop lever 229 of the call signal shaft 225. The stop cam 228 being freed by the stop lever 239, the call signal shaft 225 is allowed to rotate.

As soon as said rotation begins, the cam 236 allows the lever 237 to drop, under the action of the spring 238, swinging downwards the frame 239 to drop a lever, such as 240, towards each storing bar; said lever is urged by a light spring 241. Simultaneously, the cam 242 allows a lever 243 to move towards the storing bars which are to transmit for the first combination of the "resting" polarities, the said lever 243 being pulled by a strong spring 244. The storing bars which are to transmit a "working" polarity at the first combination, are urged to the right by the pin 245 carried by the lever 240, while the storing bars which are to emit a "resting" polarity are urged to the left by the pin 246 carried by the lever 243. At the same time, the arm 247 moves, by means of the bar 248, the hook 91 which releases the stop lever 94 of the transmission thus causing the transmission and translation of the combination registered by the storing bars 75.

As the rotation of the call signal shaft 225 is proceeding, the cams such as 242 are modifying the combination registered in the storing bars 75 in order that they will be forming the second character to be transmitted. By the end of the revolution of the transmission shaft 97, the lever 94 does not meet the hook 91 which is held out of engagement by the rod 248; said lever falls again under the action of the spring 96, causing the transmission and translation of the new combination registered in the storing bars 75. The relative speeds of the shafts 1 and 4 are so calculated that, to a revolution of the shaft 1, will correspond a forward displacement of a combination on the shaft 225. The same operation is reproduced until the last combination of the call signal has been transmitted, during which the lever 237 is lifted by the cam 236, allowing the hook 91 to fall and, accordingly, stopping the revolution of the cam shaft 97. The call signal shaft 225 is stopped also when the cam 228 abuts against the stop lever 229.

During the entire revolution of the shaft 225, the lever 237 pulls on the bar 249, the action of which is to lock in idle position all the key levers, preventing the operator from modifying the transmission of the call signal. If it is supposed that the combination: "Who is there?" is simultaneously transmitted and translated, the locking cam 199, acting through the roller 200 and the bar 250, draws to the left the lever 251 carrying the pin 235.

At the time when the translating mechanism operates the lever 148, the pusher 234 is withdrawn away from the lever 229 by the pin 235. Consequently, the call signal shaft 225 is not started.

A push member 252 operated in the direction of the arrow 253 by means of a key (not shown) enables the operator to move the stop lever 229 and to start the call signal transmitting device.

Repeated transmission of the same combination

A push member 254 operated in the direction of the arrow 255 by means of a key (not shown) enables the operator to cause the continuous rotation of the transmission cam shaft 97. Consequently, if the operator holds a key depressed at the same time as the push member 254, the corresponding combination is continuously repeated, at the maximum speed of the apparatus, until the control repeating key is released.

*Letters-figures mechanism*

The type bars, such as 154, are mounted on a segment 256 adapted to hold two positions, in which it is brought by a linked parallelogram formed of a frame 257 and a lever 258, the link 153 coupling the lever 147 to the type bar 154 in both said positions of the segment. The frame 257 is connected through a link 259 to a lever 260 carrying a roller 261, said roller contacting a reversing cam 262 mounted on a plate 263 carrying a pawl 264 engaging a ratchet wheel 265. The spring 266 constantly urges the frame 257 upwards. The cam 262 and plate 263 assembly is frictionally mounted over the unregulated rotating shaft 2. The tail of the pawl 264 can be acted upon by either of two disengaging fingers 267 and 268 carried by a common shaft 269 also carrying a plate 270. On said plate are secured two fingers 271 and 272 which can be pushed by the levers 273 and 274 connected to the seekers 145 and 146, respectively, and corresponding to the combinations "figures" and "letters."

If it is supposed that, for instance, the combination "figures" has been translated, the disengaging finger 268 is positioned in the path of the pawl 264, which abuts thereagainst; the reversing cam 262 is thus arrested in such a position that the lever 260 allows the frame 257 to be raised to its highest position under the action of the spring 266. Consequently, if the type 155 is provided with a figure at the base and a letter at the top, the figure will be printed.

Assuming, further, that the combination "letters" is translated, the seeker 146 is actuated by the striking bar 144; the lever 274 is pulled forward and engages the pin 272, whereby the shaft 269 moves the finger 268 backwards and the finger 267 in the path of the pawl 264. The finger 268 being displaced, the pawl 264 engages the ratchet wheel 265, to drive the reversing cam 262 until the pawl 264 contacts the finger 267. The reversing cam 262 is then locked in a new position; it thus brings the frame 257 in its lowest position so that, when a combination will be received subsequently, the apparatus will print letters.

If it be supposed, now, that the combination "figures" is translated, the seeker 145 is operated to push the pin 271 and causing the withdrawal of the finger 267; the finger 268 being brought in the path of the pawl 264, engagement takes place, as before explained, bringing the reversing cam 262 in the position in which the pawl 264 is disengaged by the finger 268 and in which the apparatus prints figures.

Some parts of the apparatus can be operated in "figures" by combinations which will have to print a character in "letters." This is particularly the case for the call bell and for the control "Who is there?" which, according to the international code for teletypes, are operated by the same combinations which, in "letters" respectively print the characters J and D. The "letters-figures" mechanism enables the proper separation by the members shown in Fig. 6. The levers 145 and 146 corresponding respectively to "letters" and "figures" are provided with wedges 275 and 276 adapted to move a roller 277 carried by the lever 278; said lever pivoted at 279, displaces the locking bar 280 arranged parallel to the combining bars such as 124 and sliding on the same fingers 125 and 126. The locking bar 280 is maintained at either end of its stroke by means of a jumping roller 281 carried by the lever 282 subjected to the constant action of the spring 283. The bar is provided with two teeth 284 and 285 movable under the seekers 148 and 286, respectively, which control the release of "Who is there?" and the call bell when the bar 280 is moved to its idle position at right corresponding to "letters." When the bar is to the left, the teeth thereof allows the seeks to fall, this position corresponding to "figures."

Figure 6:
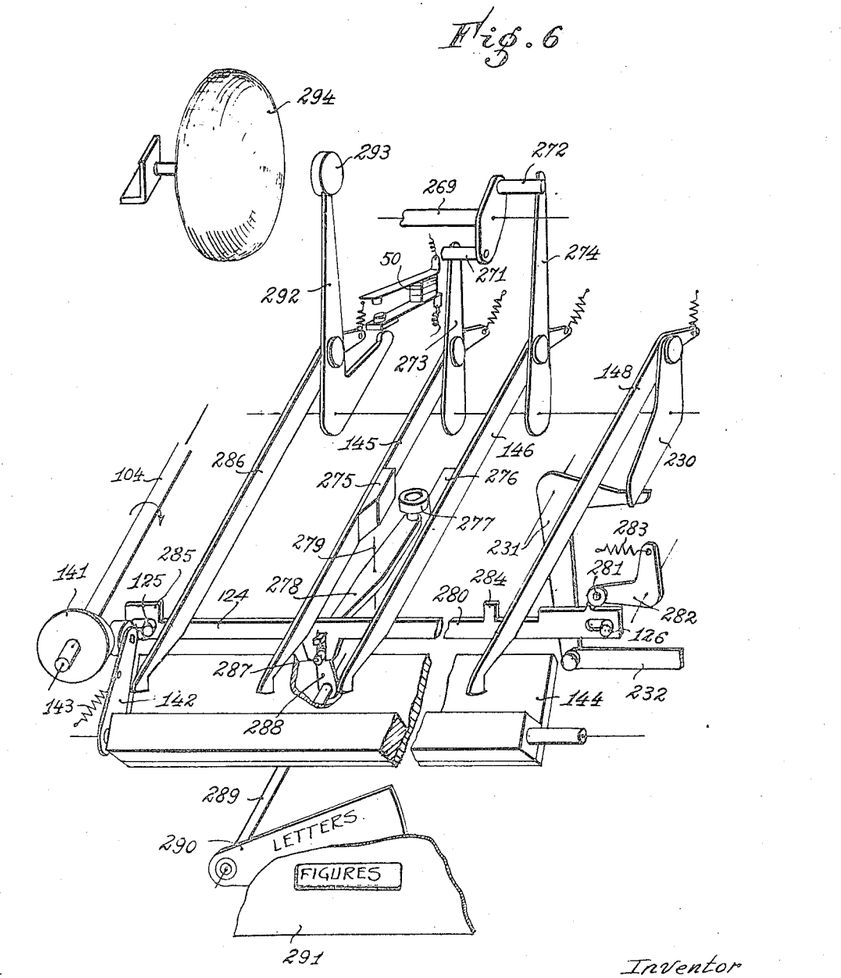
Fig. 6 shows the "characters-figures" separating mechanism.

Consequently, if it be supposed that the combination "figures" has been translated, the locking bar 280 allows the fall of the seeking levers 148 and 286. If the combination "Who is there?" for instance, is subsequently translated, the seeker 148 falls and, accordingly, is caught, by the striking bar 144 to control the releasing of the corresponding function in the above defined conditions. Supposing, instead, that the combination "letters" is translated, the seeker 146 pushes the roller 277, and simultaneously moves the pin 272, to swing the lever 278, bringing the locking bar 280 in its resting position at right. Consequently, if the combination "Who is there?" is for instance, translated, the seeker 148 is prevented from falling and there is no releasing of the mechanism.

By means of the stud 287 on the arm 288, the locking bar 280 actuates a shaft 289 carrying a name plate 290 displaying "figures" or "letters" through an aperture 291 of the machine cover, as the case may be.

*Call bell*

The seeker 286 (Fig. 6) is linked to a bell crank 292 carrying a hammer 293 adapted to strike a gong 294 and controlling at the same time the closure of the contacts 50. Consequently if it is supposed that the combination "alarm" is received in figures, the seeker 286 is operated by the universal striking bar 144 and the gong struck. At the same time, the contacts 50 are closed. This quick contact is used by known devices outside of the apparatus for giving a signal for instance.

*Feeding of the paper band*

Figure 7:
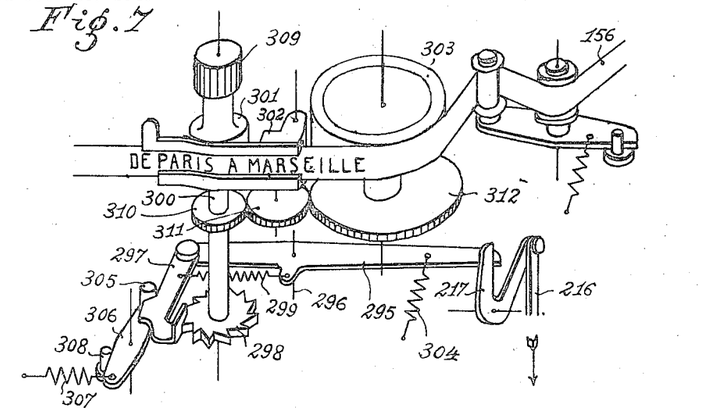
Fig. 7 shows the paper band advancing mechanism.

Fig. 7 shows the feeding mechanism of the paper band in apparatus using such bands or tapes. When a seeking lever 147 is operated, the universal bar 215 actuates the arm 217 by means of the bar 216; this movement oscillates the lever 295, pivoted at 296, and called back by the spring 304. Said lever 295 actuates the pawl 297 urged against the ratchet wheel 298 by the spring 299. Said ratchet 298 is mounted on a shaft 300 carrying a feed roll 301 against which the tape 156 is applied by means of the paper channel 302. Before entering the channel 302, the paper tape is trained over a rubber platen 303 which serves as a support for striking the characters. When the striking of the character is accomplished, the universal bar 215 goes back again, driving the push member 216 and the lever 217. The lever 295 steps back the pawl 297 to drive the ratchet 298, and advance one space the paper tape 156. At the end of the stroke, the pawl 297 is locked accurately between the wheel 298 and a finger 305 carried by a lever 306 urged by a spring 307 against a stop 308. The operator can advance the tape 156 by revolving the wheel 301 by means of the milled knob 309. At the same time the shaft 300 drives the rubber platen 303 by means of the gear train 310, 311 and 312. The pitch of the gears 310 and 312 is such that the platen 303 will have a forward displacement smaller than that of the tape 156, whereby friction will always exert upon the said tape a small tension; furthermore, the advancement of the platen will be such that the types will strike at odd places thereon to avoid pitting.

As the levers 273 and 274, which translate the combinations "figures" and "letters," do not operate the universal bar 215, they do not cause the advancing motion of the paper band 156.

Counter

Figures 8, 9:
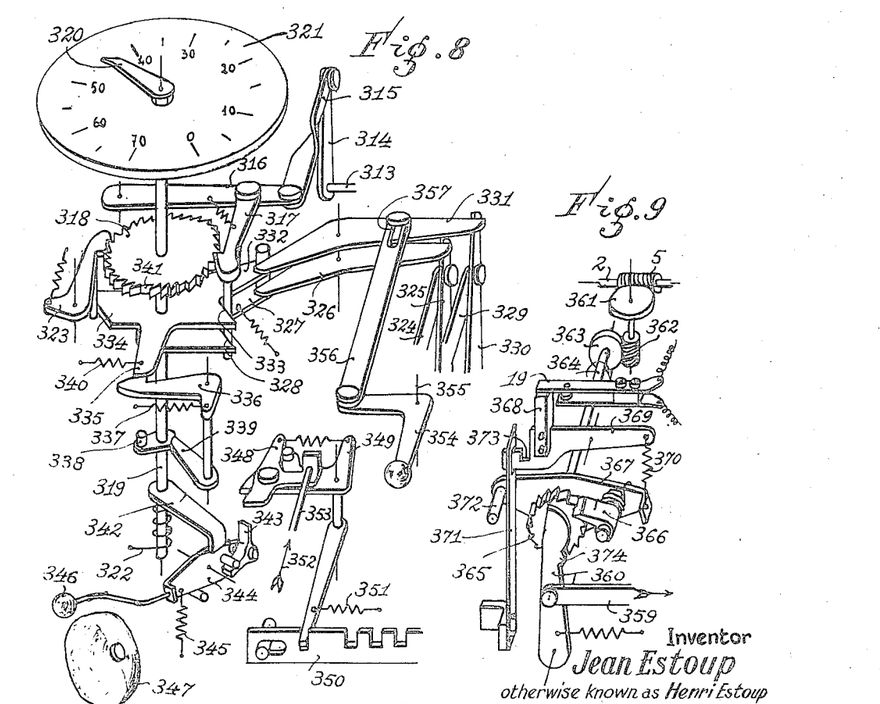
Fig. 8 shows the characters counting mechanism.
Fig. 9 shows the motor automatic starting and stopping mechanism.

In order to operate apparatus printing on a wide paper sheet on a carriage similar to those of typewriting machines, using apparatus printing on narrow paper tape, the said apparatus are provided with character counter mechanism shown in Fig. 8. The said mechanism receives the energy that is necessary to its operation from the universal bar 215 and, consequently, from the unregulated shaft 2.

As a character-printing seeker is operated, the shaft 313 (Fig. 8) of the universal bar 215 drives a lever 314 which, by means of a twisted link 315 pulls an arm 316 carrying a movable pawl 317. Said pawl actuates a ratchet wheel 318 secured on a shaft 319 which carries a pointer 320 moving above a dial 321, said pointer being subjected to the constant call-back action of a spring 322 wound clockwise around 319. As the pawl 317 moves backwards, holding pawl 323 prevents the wheel 318 from moving. Each alternative motion of the universal bar 215 thus advances by one tooth the ratchet 318 and the pointer 320.

If it be supposed that the seeker 324 is operated, corresponding to the "line spacing" combination, for printing a reference character on the tape apparatus without advancing the carriage of a wide sheet printing apparatus, the intermediate lever 325 pulled by the seeker 324 moves a lever 326 swinging a plate 327 freely pivoted about the shaft 319, said plate including a sloped ramp 328 releasing the moving pawl 317 at the same time as the latter is pulled by the universal bar 215. The ratchet wheel 318 is accordingly not driven and remains in the position taken after the preceding strike, even though the motion of the intermediate lever 325 causes printing of conventional character and, by operating the universal bar 215, effectuates the forward motion of the paper tape 156.

Again supposing that the seeker 329 is operated, corresponding to the "carriage return" combination, printing of a conventional character and the forward displacement of the paper band 156 will occur by means of the universal bar 215; simultaneously, the intermediate lever 330 will be pulled to push a lever 331 swinging a plate 332 pivoted freely about the shaft 319. The plate 332 is provided with two ramps 333 and 334, respectively, releasing the pawls 317 and 323; said plate carries a finger 335 which comes in engagement with a hook 336 constantly urged back towards the finger 335 by a spring 337. The ratchet wheel 318 being released, the shaft 319 will be turned in clockwise direction by the spring 322, until a pin 338 engaging a lever 339 dislodges the pawl 336 to release the plate 332. Said plate pivoting under the action of the spring 340, brings both pawls 317 and 323 in engagement with the ratchet wheel 318.

In order to avoid damaging the apparatus, should a wrong manipulation occur, if the translator did not receive in due time a "carriage return" combination, the ratchet 318 is formed with a lacking tooth gap 341 in front of the position corresponding to the 69th character, for instance, if the carriage apparatus is designed for receiving 69 characters in each line. Consequently, if the number of characters being received since the last translation of the "carriage return" combination is higher than 69, the pawl 317 in meeting the tooth gap 341 cannot wind up the ratchet 318 and the pointer 320 continues to indicate "69" until a "carriage return" combination is again translated.

So that the advancing motion of the ratchet 318 be continued when the tooth gap 341 is brought in front of the fixed pawl 323, the said pawl is provided with two teeth.

For advising the operator that the end of a line is coming near, an arm 342 pushes a pawl 343 mounted on lever 344 subjected to the constant action of a spring 345. As the pointer reaches the 60th character, the lever 344 is released by the lever 342 and falls down to strike the hammer 346 upon a gong 347. As the advancing motion of the pointer 320 continues, the lever 342 pushes a pawl 348 carried by an arm 349, said arm moving a toothed bar 350 arranged parallel to the toothed bar 249 and adapted to lock against movement all the key levers, except the lever controlling the carriage return; the toothed bar 249, however, locks in place all the keys without exception. The said locking may, for instance, take place at about the 65th character. If the operator still must print some characters, a key (not shown) enables him to push in the direction of the arrow 352 a rod 353 which presses on the pawl 348 to release it from the arm 342. The toothed bar 350, being freed, comes back, under the action of the spring 351, in releasing position of the key levers. As the pointer 320 reaches the mark 69, the arm 342 contacts directly the arm 349 and brings the toothed bar 350 back in locking position of the key levers, from which it cannot be released unless the translator in translating the "carriage return" combination brings the pointer 320 back in starting position.

In order to dispense the operator of striking on the key "carriage return" for unlocking the key-board, after every series of 69 characters, if the apparatus corresponds with another apparatus for tape printing, a lever 354 pivoted by friction about the shaft 355 can be made by the operator to hold the lever 331 by means of the slotted bar 356 and, thus, maintain the plate 332 in the position in which the pawls 317 and 323 are disengaged from the ratchet wheel 318, thus constantly leaving the pointer 320 in zero position. The slot 357 formed in the bar 356 enables the lever 331 to move freely when the holding lever 354 is brought by the operator in inoperative position.

Automatic starting and stopping of the motor

The motor O is started when the stop lever 94 of the transmission cams, or the stop lever 175 of the receiving cams (Fig. 5) falls under the action of a key or of the receiving of a starting impulse. It is stopped after a given time, that is: after the last operation of the stop levers 94 and 175.

For that purpose, as they fall, the levers 165 connected to the levers 94 and 175 swing the rocker 358 which, by means of the bar 359 (Figures 5 and 9) operates the lever 360. The time counter mechanism is operated by the unregulated shaft 2 which, through the worm and gear train 5, 361, 362 and 363 drives in clockwise direction a shaft 364 carrying a ratchet wheel 365 engaging a pawl 366 pivoted to an arm 367 freely pivoted about the shaft 364. The motor is energized through contacts (only one, 19, is shown) which can be opened together by an insulating block 368 carried upon lever 369. The levers 367 and 369 are together by a spring 370 which can be fully distended, so as to let the lever 369 come in engagement with a flat apertured spring 371.

Consequently, supposing that the lever 360 is pulled by the bar 359, said bar will lift the pawl 366, thereby allowing the lever 367 to swing under the action of the spring 370 until the latter is completely distended. The lever 369 is then free to swing also, allowing the contacts 19 to be closed, and engaging the spring 371. Assuming that, for some time, the bar 359 imparts no impulse to the lever 360, the ratchet wheel 365 revolving in a clockwise direction swings, by means of the pawl 366, the lever 367 which tensions the spring 370. But the flat spring 371, by holding the lever 369 depressed, prevents opening of the contacts 19. If it be supposed that the bar 359 imparts an impulse to the lever 360, the pawl 366 is lifted and the lever 367 comes back in starting position without opening the contacts 19. If no more starting impulses of the motor occur, the lever 367, after a time which is determined by the arrangement of the operating parts, pushes by means of a pin 372 the flat spring 371 which is bent opposite the slot 373 of the lever 369, allowing same to swing up and to open the contacts 19 and stopping the motor O.

In order to avoid damaging parts in the event that contacts 19, be shorted, or stuck, so the motor would not stop, the arm 360 carries a tooth 374 upon which the pawl 366 may climb: the pawl 366 is thus released and falls in a preceding tooth.

*Advance and return made*

Figure 10:
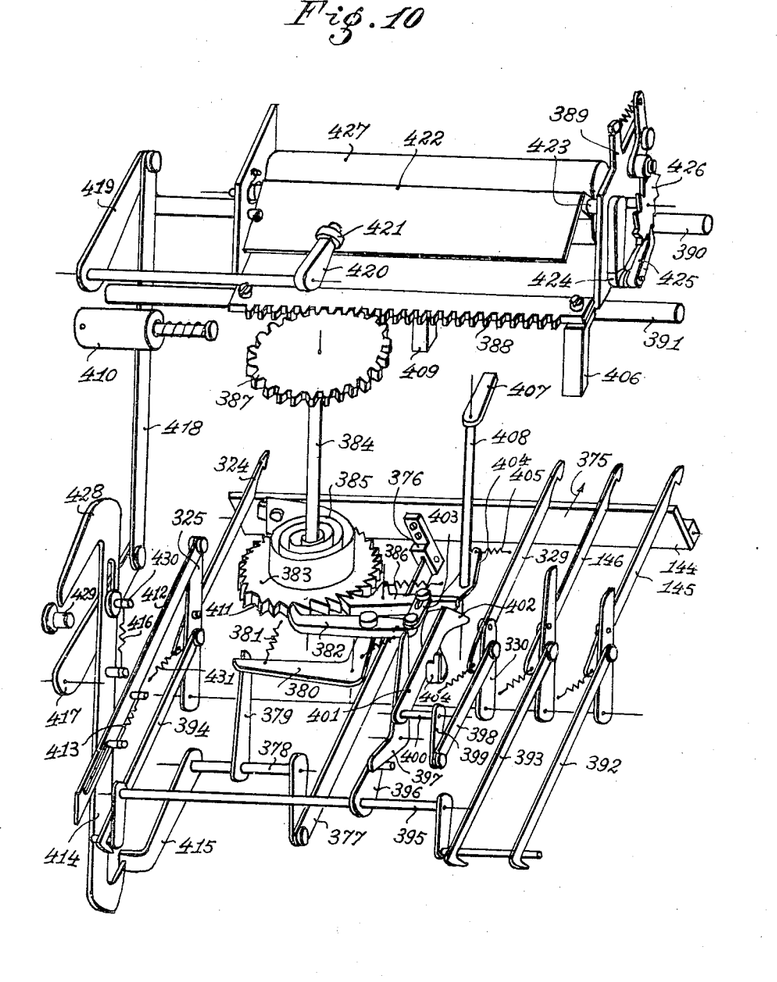
Fig. 10 shows the carriage advancing and return mechanism as well as the mechanism for spacing between lines.

In the embodiment in which printing is made on a wide paper sheet on a carriage, the advance and return of the carriage are obtained by the mechanism shown in Fig. 10, operated by the shaft 2 by means of the universal striking bar 144.

As the shifting up of the carriage requires a considerable effort, the universal striking bar 144, taking its energy from the spring 143 (Fig. 5) is only used for initiating the displacement of the carriage. The latter is operated by the return of the universal striking bar 144, which takes place when the lever 142 is pushed by the cam 141.

If, for translating a combination, the striking bar 144 is moved in the direction of the arrow 375 (Fig. 10), allowing all seekers to drop, the arm 376 pushes the bar 377 and, revolving the shaft 378 carrying the lever 379, allows the lever 380 to be retracted under the action of the spring 381. The lever 380 is provided with a movable pawl 382 which jumps out of a tooth of the ratchet wheel 383. Said wheel is carried by the shaft 384 constantly urged in counter-clockwise direction by the spiral spring 385. A pawl 386 prevents the ratchet wheel from coming back. By means of the rack 388 the gear 387 drives a paper carriage 389 slidable on two rods 390 and 391. As the universal bar 144 returns, the bar 377 is pulled to actuate the levers 379 and 380. The movable pawl 382 advances the ratchet wheel 383 one tooth and moves the carriage 389 one space.

The advancing motion of the carriage is to be arrested when the combination being translated is either "letters," "figures" or "line space." To this end, the corresponding seekers 145, 146 and 324 control by means of rods 392, 393 and 394 the rotation of a shaft 395 carrying an arm 396. Through the intermediary of crank lever 397, the arm 396 causes displacement of the tail of the moving pawl 382 at the same time as the latter is drawn backwards during the forward stroke of the universal bar 144, as explained above. Consequently, the moving pawl 382 cannot jump a tooth of the ratchet 383, and the advancing motion of the carriage by the return of the universal bar 144 is accordingly prevented.

If it be supposed that the "carriage return" combination is translated, the corresponding seeker 329 pulls lever 330, the bar 398 and lever 399, whereby said lever 397 is pivoted about the axis 400. The lever 401 is provided with a ramp 402 engaging the tail of the pawl 386, which swings through a slotted link 403, the movable pawl 382, thus releasing the ratchet wheel 383 and consequently the shaft 384. The carriage is then returned by the shaft 384 rotated by the wound spring 385. At the same time, the lever 401 allows the hook 404 to rock under the action of the spring 405. As the universal striking bar 144 effectuates its return stroke, the lever 401 is freed, but is arrested by the hook 404, whereby the pawls 382 and 386 are kept raised from the ratchet 383. When the carriage reaches its starting position, a stop 406 on said carriage moves the lever 401 carried by the shaft 408 upon which is secured the hook 404; said hook being swung sideways, releases the lever 401 which, in falling, allows reengagement of the pawls 382 and 386 with the ratchet 383. A lug 409 which abuts against a dash pot 410 dampens the shock at the end of the carriage stroke. In the same way, as for the above described character counter, a tooth gap 411 prevents the carriage from going beyond a predetermined position and the pawl 386 is provided with two teeth.

A bell advising of the line completion and a double locking of the key levers, similar to those described in connection with the character counter mechanism, are operated by the lug 409 to guide the operator in typing.

*Line spacing*

If it be supposed that the seeker 324 (Fig. 10), corresponding to the "line space" combination has fallen and has been driven by the universal bar 144, said seeker will actuate by means of the lever 325 and the rod 412, a spring 413 which pulls hook member 414. The said member rests upon an arm 415 carried by the shaft 378 which, accordingly, is raised during the advancing stroke of the universal bar 144, and lowered by the end of such stroke. As the universal bar 144 starts its return movement, the member 414 is driven downwards by the arm 415 and, through a spring 416 imparts its motion to a lever 417. Acting upon bar 418 and lever 419, said lever 417 displaces an arm 420 carrying a roller 421 resting upon a plate 422 extending from the shaft 423 of the carriage 329. By means of an arm 424 the shaft 423 drives a pawl 425 which advances a tooth at a time the ratchet which is secured to the shaft of the paper carrying platen 427. At the end of the downward stroke of the arm 415, the extension 428 of the member 414 comes against a stop 429. The member 414 is swingable about the stud 430 holding one end of spring 431 of the seeker 324.

Starting adjustment of the receiving cam shaft

Figure 11:
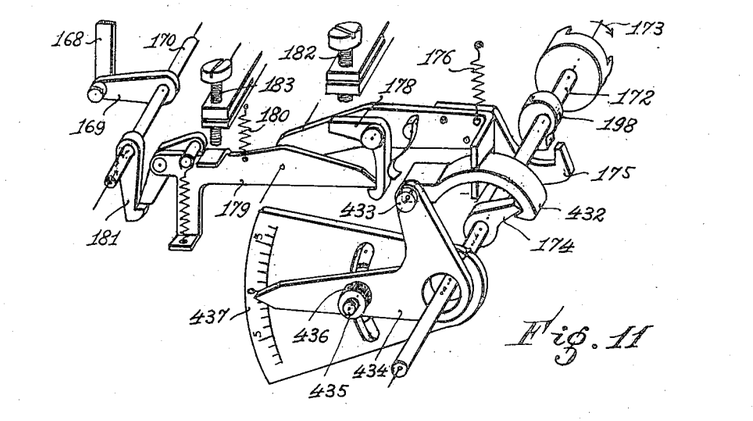
Fig. 11 shows the starting adjusting device of the receiving cams.

In order to adjust the starting position of the receiving cam shaft, the device causing the starting and stopping of said shaft may be replaced, in a specific embodiment, by the device shown in Fig. 11, having the same mechanical operation as that shown in Fig. 5 with the only difference that the finger 174 is stopped, not directly by the lever 175, but by a hook 432. Said hook is freely pivoted about a pivot 433 carried by an adjustable crank arm 434 journalled around the receiving cam shaft 172, but without any connection with it. The hook 432 has an arcuate body slidable in a slot formed in the lever 175, thereby following all its motions whatever the position taken by the pivot 433. The arm 434 is clamped by a milled nut 436 threaded on a screw 435 on a calibrated sector 437. Consequently, should the operator notice, from the receiving rate of the apparatus, that the receiving cam shaft 172 operates the receiving cams too early, it will only be necessary to loosen the nut 436 and to move the arm 434 in opposite direction with respect to the arrow 173. The hook 432 thus arrests more early the shaft 172; the time required by the shaft 172 for reaching the operation point of the receiving cams will be increased correspondingly. If it is ascertained that the receiving cams are operated too late, the reverse manipulation will have to be made.

Automatic advance and reverse motion of the printing ribbon

Figure 12:
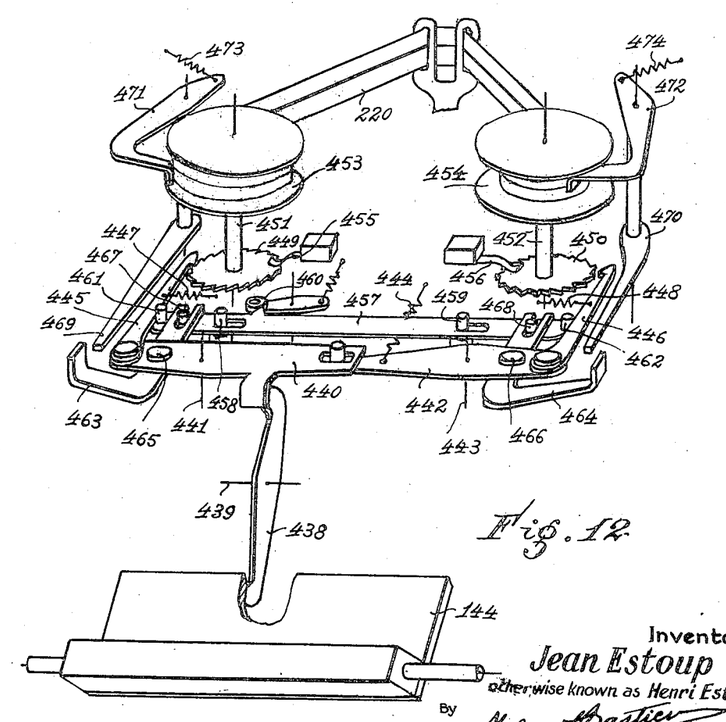
Fig. 12 shows the automatic advancing and return mechanism for the printing band.

The energy necessary to the automatic displacement of the printing ribbon 220, shown in Fig. 12, is taken directly from the universal striking bar 144 operated by the unregulated shaft 2 (Fig. 1).

At rest, the universal striking bar 144 (Fig. 12) bears upon the lever 438, pivoted at 439, which in its turn contacts a left advancing lever 440 oscillating about the axis 441 and displacing a right advancing lever 442 to which it is connected, said lever 442 pivotable at 443. The assembly of both advancing levers 440 and 442 is subjected to the constant action of a pull-back spring 444. The advancing levers 440 and 442 respectively carry the movable pawls 445 and 446 urged by the springs 447 and 448. The pawls 445 and 446 are engageable with two ratchets 449 and 450 driving, through the shafts 451 and 452, the reels 453 and 454 carrying the printing ribbon 220. The ratchets 449 and 450 are braked by two light springs 455 and 456. A bar 457, slidable upon the pins 458 and 459, and maintained in either of its end positions by a spring pressed jumping roller 460, is provided with two studs 461 and 462. Supposing that the rod 457 be maintained in its right resting position, as shown, the stud 462 will withdraw the pawl 446 from the right ratchet 450 whilst the stud 461 leaves free the left pawl 445. Consequently, if it be supposed that, as the translator is being operated, the universal bar 144 comes forward to strike a character, the lever 438 is liberated from contact with the universal bar 144 and the assembly of the levers 440 and 442, under the action of spring 444, is displaced backwardly to drive forward both pawls 445 and 446. The pawl 445 engaged with ratchet 449 drives same and winds up the printing ribbon 220 on the reel 453. Assuming, now, that the rod 457 be in the left position, the stud 461 removes the pawl 445 from the left ratchet 449 and the stud 462 allows the pawl 446 to engage the ratchet 450. The displacements of the universal striking bar 144 consequently causes the displacement of the ratchet 450 to wind up the ribbon 220 on the reel 454.

For automatically changing the winding direction of the ribbon 220, when one reel is empty and the other full, the levers 440 and 442 are provided with hooks 463 and 464 pivotable at 465 and 466 and forked about pins 467 and 468 carried by the bar 457. Both hooks are engageable with two fingers 469 and 470 integral with two pressers 471 and 472 urged by two light springs 473 and 474 on the ribbon 220 wound within each reel 453 and 454. As a reel fills up, the corresponding fingers 469, or 470, comes opposite a hook 463 or 464. Consequently, if the left reel 453, for instance, is full, the left finger 469 comes in the path of the left hook 463. As the universal bar 144 returns, the hook 463 abuts against the finger 469 and pivoting about 465, drives the pin 467 to the left and moves the bar 457 to the left position. The result is the release of the left pawl upon ratchet 449 and the engagement of the right ratchet 450 by means of the pawl 446. When the reel 450 is filled, the same operation is repeated to reverse direction of movement of the ribbon 220.

It must be understood that various changes as to the size, shape and arrangement of parts may be resorted to without departing from the spirit of the invention, or the scope of the subjoined claims.

What I claim as my invention and desire to secure by Letters Patent is:

1. Transmitting telegraphic apparatus of the start-stop type comprising, in combination, a keyboard manipulator, selector members adapted to be actuated by the keys of the manipulator, recording elements adapted to be set by the selector members, transmitting polarity contacts, a transfer mechanism adapted to set the polarity contacts according to the recording elements setting, a non-regulated shaft, a cam actuated by said shaft for driving the transfer mechanism, a rotary transmission distributor mechanism, a controlled shaft adapted to drive the transmission distributor, a centrifugal regulator adapted to brake the rotation speed of the controlled shaft, and a single electric motor rotating at a speed higher than that of the controlled shaft and driving the non-regulated shaft through non-sliding couplings and the controlled shaft through a constant-friction slipping coupling.

2. Transmitting telegraphic apparatus of the start-stop type having translating means comprising, in combination, a keyboard, selector members adapted to be actuated by the keyboard, recording elements adapted to be set by the selector members, transmitting polarity contacts, a printing mechanism adapted to print a character in accordance with the setting of the translating means, a transfer mechanism adapted to set the translating means secured to the polarity contacts in accordance with the position of the recording elements, a shaft revolving at a non-regulated speed, a cam driven by said shaft for actuating the transfer and printing means, a rotary transmitting distributor, a controlled-speed shaft adapted to drive the transmitting distributor, a centrifugal regulator brake for limiting the rotating speed of the shaft, and a single electric motor rotating at a speed above that of the controlled shaft driving the non-regulated shaft through the intermediary of rigid couplings and the controlled shaft by means of slipping constant-friction couplings.

3. Receiving and translating telegraphic apparatus of the start-stop type comprising, in combination, a rotary receiving distributor, a controlled-speed shaft adapted to drive said distributor, a centrifugal regulator brake adapted to limit the shaft speed, recording elements adapted to be set by the said distributor, translating combination members, a printing mechanism adapted to print characters in accordance with the setting of the translating members, a transfer mechanism adapted to set the translating members in relation to the setting of the recording elements, a non-regulated speed shaft, a cam driven by said last shaft for actuating the transfer mechanism, and a single electric motor of a speed higher than that of the controlled shaft driving the non-regulated shaft through the intermediary of rigid couplings and the controlled shaft by means of constant-friction slipping couplings.

4. Transmitting, receiving and translating telegraphic apparatus of the start-stop type comprising, in combination, a keyboard, selector members adapted to be actuated by the keyboard, a rotary distributor transmitting mechanism, a rotary distributor receiving mechanism, a controlled-speed shaft for driving said transmitting and receiving mechanisms, a centrifugal brake for limiting the speed of the controlled shaft, recording elements adapted to be set by either the selector members or the receiving distributor, transmitting polarity contacts, translating combination elements secured to the contacts, a printing mechanism adapted to print characters in accordance with the setting of the translating elements, a transfer mechanism adapted to set the said translating elements in relation to the position of the recording elements, a non-regulated speed shaft, a cam driven by said shaft for actuating the printing and transfer mechanisms, and a single electric motor of a speed higher than that of the controlled shaft driving the non-regulated shaft through rigid couplings and the controlled shaft by means of constant-friction slipping couplings.

5. In a telegraphic apparatus according to claim 4, type bars each carrying a letter and a figure or sign, a type bar segment adapted to take a first position in which each type bar is adapted to print the letter it carries and a second position in which the figure or sign is printed, a lever adapted to move the segment in either of said positions, a spring acting on said lever for raising the segment, a cam limiting the displacement of the lever actuated by the non-regulated shaft, and stop means driven by the printing means into "numerals" or "letters" position of operation of the stop means.

6. In a telegraphic apparatus according to claim 4, a blocking lever adapted to prevent movement of the transmitting distributor, a pull-back spring for said lever, a hook adapted to hold said lever in operative position, a retractable plunger for operating the lever, lever means moved by the selector members when a key is depressed for actuating the plunger, a cam for setting the blocking lever actuated by the transmitting distributor, said cam freeing the lever near the end of its travel, and a cam integral with the distributor for retracting the plunger at the start of its rotation.

7. In telegraphic apparatus as claimed in claim 4, a blocking lever adapted to prevent movement of the transmitting distributor, a lever actuated by the receiving distributor towards the end of its rotation, a stop hook adapted to free the cam actuating the transfer and printing mechanisms, and a rod adapted to be pulled by the blocking lever of the transmitting distributor and the receiving distributor-actuated lever when either of which is actuated.

8. In a telegraphic apparatus as claimed in claim 4, a finger actuated by the transfer mechanism adapted to push upwardly, at the time of transfer, the selector members and the key actuated when such a key has been struck.

9. In telegraphic apparatus as claimed in claim 4, an electro-magnet adapted to be energized by line impulses, an oscillating device driven by said electro-magnet and a blocking lever of the receiving distributor, a pull-back spring for said blocking lever, an intermediate lever for holding the blocking lever, a pawl on the oscillating device, a hook on said pawl upon which the intermediate lever rests, said pawl disengaging the intermediate lever at the end of its movement, a light spring for retracting the intermediate lever, and a cam integral with the receiving distributor for resetting the blocking lever with the intermediate lever.

10. In telegraphic apparatus as claimed in claim 4, an electro-magnet adapted to be energized by line impulses, an oscillating device driven by said electro-magnet, a spring for pulling back a blocking lever of the receiving distributor, an intermediate lever for holding said blocking lever, a pawl on the oscillating device, a hook on said pawl upon which the intermediate lever rests, the pawl disengaging the intermediate lever at the end of its movement, a light spring for retracting said intermediate lever, a cam secured to the receiving distributor for resetting the blocking lever onto the intermediate lever, a stop pawl, and a finger secured to the receiving mechanism distributor for engaging the stop pawl, said finger being pivoted onto a lever adapted to be rotated around the receiving distributor shaft and settable by a graduated dial, said stop pawl being circular and slidable within a slot formed in the blocking lever of the receiving mechanism distributor.

11. In telegraphic apparatus as claimed in claim 4, a blocking lever adapted to arrest movement of the transmitting distributor, and a cam set adapted to be slowly driven through the intermediary of rigid couplings connected to the controlled shaft, one of the cams maintaining inoperative the blocking lever of the transmitting distributor, another cam actuating a comb locking all the keyboard keys in position of rest, the remaining cams setting the recording elements in predetermined order, the transmitting polarity contacts being set by the transfer mechanism actuated by the non-regulated shaft.

12. In telegraphic apparatus as claimed in claim 4, a tape printing mechanism, a type counting mechanism, a blocking comb adapted to lock all keys with the exception of "line return," a spring urging said comb into keys-freeing position, a pawl lever, a hammer on said lever for striking a bell, a pawl lever adapted to move the comb into key-locking position, a finger pivoted on the shaft of the type counter for actuating the bell striking hammer and acting upon the comb-moving lever, and an auxiliary key depressing a plunger disengaging the pawl lever to release the comb, the pivoted finger acting directly also on the lever moving the comb into locking position when the number of characters forming a line is reached.

13. In telegraphic apparatus as claimed in claim 4, a carriage adapted to carry a sheet of paper, an interlining mechanism adapted to advance the paper one line at a time, a universal translating bar actuated by the transfer and printing cam, a seeker operable when the "interline" combination is translated, an arm actuated by the universal bar, a finger moved by the said bar, the seeker pulling said finger, levers for transmitting the finger movement to the interline mechanism, and a fixed stop disengaging the finger from the pull of the arm before the return to rest of the said universal bar.

14. In telegraphic apparatus as claimed in claim 4, a blocking lever on the transmitting distributor, a blocking lever on the receiving distributor, a contact, a contact breaking lever adapted to open said contact, a flat spring for arresting said lever, a shaft slowly rotated by the non-regulated shaft, a time-keeping lever, a pawl on said lever, a ratchet on the slow speed shaft for engaging the pawl, a spring secured to the time-keeping lever urging said lever to the contact-breaking position, a finger carried by the timekeeping lever for progressively moving the flat spring toward the lever-liberating position, and a pawl disengaging lever adapted to be actuated by either of the transmitting and receiving distributors blocking levers.

15. In telegraphic apparatus as claimed in claim 4, a translating universal bar adapted to be actuated by the transfer and translating cam, an inking ribbon for printing characters on paper, return and advance mechanism for said ribbon, and a lever adapted to receive an alternating movement of the universal bar actuating the said ribbon translating mechanism.

JEAN ESTOUP,
*Known as Henri Estoup.*

REFERENCES CITED

The following references are of record in the file of this patent:

UNITED STATES PATENTS

| Number | Name | Date |
| --- | --- | --- |
| 1,567,392 | Kleinschmidt | Dec. 29, 1925 |
| 1,652,320 | Nelson | Dec. 13, 1927 |
| 2,147,249 | Franklin | Feb. 14, 1939 |

FOREIGN PATENTS

| Number | Country | Date |
| --- | --- | --- |
| 912,932 | France | Aug. 23, 1946 |